US008190440B2

(12) United States Patent
Pilati et al.

(10) Patent No.: US 8,190,440 B2
(45) Date of Patent: May 29, 2012

(54) SUB-BAND CODEC WITH NATIVE VOICE ACTIVITY DETECTION

(75) Inventors: Laurent Pilati, Antibes (FR); Syavosh Zad-Issa, Irvine, CA (US)

(73) Assignee: Broadcom Corporation, Irvince, CA (US)

( * ) Notice: Subject to any disclaimer, the term of this patent is extended or adjusted under 35 U.S.C. 154(b) by 559 days.

(21) Appl. No.: 12/394,403

(22) Filed: Feb. 27, 2009

(65) Prior Publication Data

US 2009/0222264 A1 Sep. 3, 2009

Related U.S. Application Data

(60) Provisional application No. 61/032,823, filed on Feb. 29, 2008.

(51) Int. Cl.
*G10L 19/00* (2006.01)
*G10L 21/02* (2006.01)
*G10L 15/20* (2006.01)

(52) U.S. Cl. ......... 704/500; 704/226; 704/227; 704/233

(58) Field of Classification Search .................. 704/208, 704/210, 214, 215, 226, 227, 228, 233
See application file for complete search history.

(56) References Cited

U.S. PATENT DOCUMENTS

| | | | | |
|---|---|---|---|---|
| 5,749,067 | A * | 5/1998 | Barrett | 704/233 |
| 5,839,101 | A * | 11/1998 | Vahatalo et al. | 704/226 |
| 5,875,423 | A * | 2/1999 | Matsuoka | 704/220 |
| 6,502,071 | B1 * | 12/2002 | Nagasaki | 704/226 |
| 6,510,409 | B1 * | 1/2003 | Su | 704/233 |
| 6,643,617 | B1 * | 11/2003 | Wood et al. | 704/226 |
| 6,711,536 | B2 * | 3/2004 | Rees | 704/210 |
| 6,714,907 | B2 * | 3/2004 | Gao | 704/220 |
| 6,718,298 | B1 * | 4/2004 | Judge | 704/215 |
| 6,782,361 | B1 * | 8/2004 | El-Maleh et al. | 704/226 |
| 6,934,650 | B2 * | 8/2005 | Yoshida et al. | 702/76 |
| 7,197,454 | B2 * | 3/2007 | Van Der Kerkhof et al. | 704/219 |
| 7,526,428 | B2 * | 4/2009 | Chamberlain | 704/226 |
| 7,613,608 | B2 * | 11/2009 | Bollano et al. | 704/226 |
| 7,630,902 | B2 * | 12/2009 | You | 704/500 |
| 7,693,293 | B2 * | 4/2010 | Nemoto et al. | 381/94.5 |
| 7,716,042 | B2 * | 5/2010 | Schuller et al. | 704/200.1 |

(Continued)

OTHER PUBLICATIONS

Goodman et al., "Waveform substitution techniques for recovering missing speech segments in packet voice communications," IEEE transactions on Acoustics, Speech, and Signal Processing, vol. ASSP-34. No. 6, Dec. 1986, pp. 1440-1448.*

(Continued)

*Primary Examiner* — Talivaldis Ivars Smits
*Assistant Examiner* — Fariba Sirjani
(74) *Attorney, Agent, or Firm* — Fiala & Weaver P.L.L.C.

(57) ABSTRACT

A system and method for providing an augmented version of a Low-Complexity Sub-band Coder (LC-SBC) is described herein. In accordance with the method, a series of input audio samples representative of the frame are received. A series of sub-band samples is generated for each of a plurality of frequency sub-bands based on the input audio samples. A determination is made as to whether the frame is a voice frame or a noise frame. Responsive to a determination that the frame is a noise frame, an index representative of a previously-processed series of sub-band samples stored in a history buffer for at least one of the frequency sub-bands is encoded instead of encoding the series of sub-band samples generated for the frequency sub-band.

20 Claims, 12 Drawing Sheets

U.S. PATENT DOCUMENTS

| | | | | |
|---|---|---|---|---|
| 7,756,715 | B2 * | 7/2010 | Kim et al. | 704/501 |
| 7,783,477 | B2 * | 8/2010 | D'Haes | 704/203 |
| 7,797,156 | B2 * | 9/2010 | Preuss et al. | 704/233 |
| 7,917,369 | B2 * | 3/2011 | Chen et al. | 704/500 |
| 7,921,008 | B2 * | 4/2011 | Huang et al. | 704/210 |
| 8,032,365 | B2 * | 10/2011 | Sukkar | 704/228 |
| 8,032,370 | B2 * | 10/2011 | Jarvinen et al. | 704/233 |
| 8,082,156 | B2 * | 12/2011 | Shimada | 704/500 |
| 2001/0001141 | A1 * | 5/2001 | Sih et al. | 704/231 |
| 2004/0243405 | A1 * | 12/2004 | Casparian et al. | 704/226 |
| 2005/0075870 | A1 * | 4/2005 | Chamberlain | 704/226 |
| 2005/0165611 | A1 * | 7/2005 | Mehrotra et al. | 704/500 |
| 2006/0184362 | A1 * | 8/2006 | Preuss et al. | 704/233 |
| 2007/0073537 | A1 * | 3/2007 | Jang et al. | 704/233 |
| 2007/0078649 | A1 * | 4/2007 | Hetherington et al. | 704/226 |
| 2008/0027721 | A1 * | 1/2008 | Konda et al. | 704/226 |
| 2008/0040121 | A1 * | 2/2008 | Wang et al. | 704/500 |
| 2008/0082343 | A1 * | 4/2008 | Maeda | 704/500 |
| 2008/0189100 | A1 * | 8/2008 | LeBlanc et al. | 704/207 |
| 2008/0189104 | A1 * | 8/2008 | Zong et al. | 704/226 |
| 2008/0275696 | A1 * | 11/2008 | Kot | 704/211 |
| 2008/0312915 | A1 * | 12/2008 | Den Brinker et al. | 704/219 |
| 2009/0012782 | A1 * | 1/2009 | Geiser et al. | 704/223 |
| 2009/0024395 | A1 * | 1/2009 | Banba | 704/500 |
| 2009/0063142 | A1 * | 3/2009 | Sukkar | 704/226 |
| 2009/0076815 | A1 * | 3/2009 | Ichikawa et al. | 704/233 |
| 2009/0083042 | A1 * | 3/2009 | Suwabe | 704/500 |
| 2009/0187409 | A1 * | 7/2009 | Krishnan et al. | 704/262 |
| 2009/0292536 | A1 * | 11/2009 | Hetherington et al. | 704/225 |
| 2010/0094637 | A1 * | 4/2010 | Vinton | 704/500 |
| 2010/0198590 | A1 * | 8/2010 | Tackin et al. | 704/214 |
| 2010/0211385 | A1 * | 8/2010 | Sehlstedt | 704/214 |
| 2010/0241437 | A1 * | 9/2010 | Taleb et al. | 704/500 |

OTHER PUBLICATIONS

ITU-T, G.729, Annex B (Nov. 1996).* de Bont, et al., "A High Quality Audio-Coding System at 128 kb/s", 98th Audio Engineering Society Convention, Paris, France, (Feb. 25-28, 1995), 8 pages.

Advanced Audio Distribution Profile (A2DP) Specification, prepared by the Audio Video Working Group, Bluetooth Special Interest Group, (May 22, 2003), 75 pages.

* cited by examiner

300

SUB-BAND CODEC WITH NATIVE VOICE ACTIVITY DETECTION

CROSS-REFERENCE TO RELATED APPLICATIONS

This application claims priority to U.S. Provisional Patent Application No. 61/032,823 entitled "SBC Codec for Wide-band Speech with Native Voice Activity Detection," filed Feb. 29, 2008, the entirety of which is incorporated by reference herein.

BACKGROUND OF THE INVENTION

1. Field of the Invention

The invention generally relates to techniques for reducing bandwidth usage and power consumption in a wireless voice communication system.

2. Background

Sub-band Coding (SBC) refers to an audio coder framework that was first proposed by F. de Bont et al. in "A High Quality Audio-Coding System at 128 kb/s", $98^{th}$ AES Convention, Feb. 25-28, 1995. SBC was proposed as a simple low-delay solution for a growing number of mobile audio applications. A low-complexity version of this coder was adopted by the early Bluetooth™ standardization body as the mandatory coder for the Advanced Audio Distribution Profile (A2DP). For the remainder of this application, this coder will be referred to as Low Complexity Sub-band Coder (LC-SBC). LC-SBC is a fairly simple transform-based coder that relies on 4 or 8 uniformly spaced sub-bands, with adaptive block pulse code modulation (PCM) quantization and an adaptive bit-allocation algorithm.

Recently, the Bluetooth™ standardization body adopted LC-SBC as the mandatory voice codec (coder/decoder) for wideband speech communication. However, since LC-SBC was originally intended for streaming audio, it does not embody some of the common and useful features that some other voice codecs use for mobile communication.

For example, it has been observed that only about 40% of a telephone conversation contains actual speech signals. The remaining 60% consists of regions of silence or background noise. Many voice coding algorithms try to take advantage of this fact by using either Discontinuous Transmission Modes (DTX) or Variable Rate encoding to reduce the average data rate. In the DTX mode, voice activity detection (VAD) logic identifies regions of the signal with no speech activity. In the absence of speech, the level of background noise is estimated and communicated to the decoder at a much lower rate that the speech regions. At the receiver side, Comfort Noise Generation (CNG) logic creates a signal approximating of the far end background noise. Variable Rate encoding attempts to achieve the same end goal by adapting the encoding mode (and bit-rate) as function of input signal characteristics. The coding mode is communicated to the receiver along with the compressed data.

Unfortunately, LC-SBC does not provide any of the foregoing features for reducing bandwidth usage and power consumption. What is needed, then, is an extension of LC-SBC that would make it more suitable for voice compression in the Bluetooth™ framework. The desired solution should provide reduced bandwidth usage and power consumption in a Bluetooth™ system used for wideband speech communication. Furthermore, the desired solution should not modify the underlying logic/structure of LC-SBC and have a relatively low impact on voice quality. Additional, the desired solution should be applicable to other sub-band codecs.

BRIEF SUMMARY OF THE INVENTION

An audio codec is described herein that can be used to reduce bandwidth usage and power consumption in a wireless voice communication system, such as a Bluetooth™ communication system. The codec utilizes certain techniques associated with speech coding, such as Voice Activity Detection (VAD), to reduce bandwidth usage and power consumption while maintaining voice quality. In one embodiment, the codec comprises an augmented version of LC-SBC that is better suited than conventional LC-SBC for wideband voice communication in the Bluetooth™ framework, where minimizing the power consumption is of paramount importance. The augmented version of LC-SBC reduces the average bit rate used for transmitting wideband speech in a manner that does not add significant computational complexity. Furthermore, the augmented version of LC-SBC may advantageously be implemented in a manner that does not require any modification of the underlying logic/structure of LC-SBC.

In particular, a method for encoding a frame of an audio signal is described herein. In accordance with the method, a series of input audio samples representative of the frame are received. A series of sub-band samples is generated for each of a plurality of frequency sub-bands based on the input audio samples. A determination is made as to whether the frame is a voice frame or a noise frame. Responsive to a determination that the frame is a noise frame, an index representative of a previously-processed series of sub-band samples stored in a history buffer for at least one of the frequency sub-bands is encoded instead of encoding the series of sub-band samples generated for the frequency sub-band.

The foregoing method may further include determining a scale factor for each frequency sub-band based on the sub-band samples generated for each frequency sub-band. In accordance with such an implementation, determining if the frame is a voice frame or a noise frame may comprise determining if the frame is a voice frame or a noise frame based on at least one or more of the scale factors.

The foregoing method may also include determining the index representative of the previously-processed series of sub-band samples stored in the history buffer for the at least one of the frequency sub-bands. In one embodiment, determining the index with respect to a particular frequency sub-band includes a number of steps. First, a matching error is determined between the series of sub-band samples generated for the particular frequency sub-band and each of a plurality of previously-processed series of sub-band samples stored in the history buffer for the particular frequency sub-band, wherein each previously-processed series of sub-band samples is identified by an index. Then, the index corresponding to the previously-processed series of sub-band samples that produces the smallest matching error is selected.

In an embodiment, the foregoing method further includes performing a number of additional steps responsive to a determination that the frame is a noise frame. These steps include determining, for each frequency sub-band, a minimum matching error between the series of sub-band samples generated for the frequency sub-band and each of a plurality of previously-processed series of sub-band samples stored in the history buffer for the frequency sub-band. Then, the frequency sub-band having the largest minimum matching error is identified. The series of sub-band samples generated for the identified frequency sub-band is then encoded. In accordance with this embodiment, encoding the index representative of the previously-processed series of sub-band samples stored in the history buffer for the at least one of the frequency sub-bands comprises encoding an index representative of a previously-processed series of sub-band samples stored in the history buffer for every frequency sub-band except for the identified frequency sub-band.

A method for decoding an encoded frame of an audio signal is also described herein. In accordance with the method, a bit stream representative of the encoded frame is received. A determination is made as to whether the encoded frame is a voice frame or a noise frame. Responsive to a determination that the encoded frame is a noise frame, a number of steps are performed. First, one or more indices are extracted from the bit stream, wherein each index is associated with a corresponding frequency sub-band within a plurality of frequency sub-bands. Then, for each index, a previously-processed series of sub-band samples associated with the frequency sub-band with which the index is associated is read from a history buffer wherein the index identifies the location of the previously processed series of sub-band samples in the history buffer. Then, a series of decoded output audio samples is generated based on the previously-processed series of sub-band samples read from the history buffer.

In an embodiment, the foregoing method further includes additional steps that are performed responsive to a determination that the encoded frame is a noise frame. First, an identifier of one of a plurality of frequency sub-bands is extracted from the encoded bit stream. An encoded series of sub-band samples is also extracted from the encoded bit stream. The encoded series of sub-band samples is decoded in an un-quantizer associated with the frequency sub-band identified by the identifier to generate a corresponding decoded series of sub-band samples. Then, the decoded series of sub-band samples is combined with the previously-processed series of sub-band samples read from the history buffer to generate the series of decoded output audio samples.

An audio encoder is described herein. The audio encoder includes at least an analysis filter bank, scale factor determination logic, a voice activity detector, sub-band index determination logic and bit packing logic. The analysis filter bank is configured to receive a series of input audio samples representative of a frame of an audio signal and to generate a series of sub-band samples for each of a plurality of frequency sub-bands based on the input audio samples. The scale factor determination logic is configured to determine a scale factor for each frequency sub-band based on the sub-band samples generated for each frequency sub-band. The voice activity detector is configured to determine if the frame is a voice frame or a noise frame based on one or more of the scale factors. The sub-band index determination logic is configured to identify and encode an index representative of a previously-processed series of sub-band samples stored in a history buffer for at least one of the frequency sub-bands responsive to a determination that the frame is a noise frame. The bit packing logic is configured to receive the encoded index and arrange the encoded index within a bit stream for transmission to a decoder.

An audio decoder is also described herein. The audio decoder includes at least bit unpacking logic, a noise frame detector, a sub-band index reader, a sub-band samples reader and a synthesis filter bank. The bit unpacking logic is configured to receive a bit stream representative of an encoded frame of an audio signal. The noise frame detector is configured to determine if the encoded frame is a voice frame or a noise frame. The sub-band index reader is configured to extract one or more indices from the bit stream responsive to a determination that the encoded frame is a noise frame, wherein each index is associated with a corresponding frequency sub-band within a plurality of frequency sub-bands. The sub-band samples reader is configured to read, for each index, a previously-processed series of sub-band samples associated with the frequency sub-band with which the index is associated from a history buffer responsive to a determination that the encoded frame is a noise frame, wherein the index identifies the location of the previously processed series of sub-band samples in the history buffer. The synthesis filter bank is configured to generate a series of decoded output audio samples based on the previously-processed series of sub-band samples read from the history buffer responsive to a determination that the encoded frame is a noise frame.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
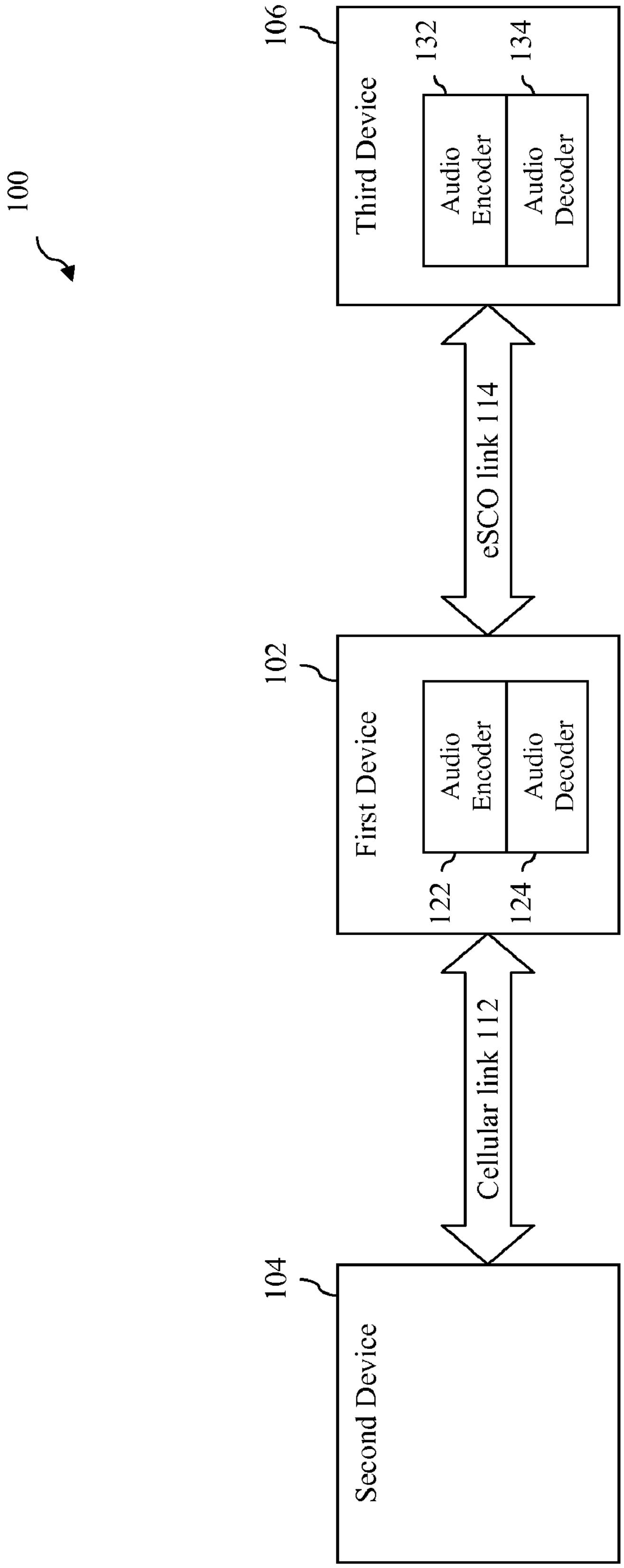
FIG. 1 is a block diagram of an example operating environment in which an embodiment of the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

B. Example Operating Environment

An embodiment of the present invention may be implemented in an operating environment which will now be described in reference to FIG. 1. In particular, FIG. 1 depicts a system 100 in which a near end user of a first device 102 is engaged in a telephone call with a far end user of a second device 104. During the telephone call, wideband speech is communicated over a cellular link 112 between first device 102 and second device 104 in a well-known manner. First device 102 may comprise, for example, a cellular phone, personal computer, or any other type of audio gateway. Second device 104 may comprise, for example, a 3G cellular phone. However, these examples are not intended to be limiting, and first device 102 and second device 104 may each comprise any type of device capable of supporting the communication of wideband speech signals over a cellular link.

As further shown in FIG. 1, the near end user may carry on the voice call via a third device 106 that is communicatively connected to first device 102 over a Bluetooth™ Extended Synchronous Connection-Oriented (eSCO) link 114. Third device 106 may comprise, for example, a Bluetooth™ headset or Bluetooth™ car kit. The manner in which such an eSCO link may be established is specified as part of the Bluetooth™ specification (a current version of which is entitled Bluetooth Specification Version 2.1+EDR, Jul. 26, 2007, published by the Bluetooth Special Interest Group) and thus need not be described herein.

To exchange compressed wideband speech over eSCO link 114, each of first device 102 and third device 106 include an audio encoder and audio decoder (which may be referred to collectively as a "codec"). In particular, first device 102 includes an audio encoder 122 and an audio decoder 124 while third device 106 includes an audio encoder 132 and an audio decoder 134. Each of audio encoder 122 and audio encoder 132 is configured to apply an audio encoding technique in accordance with an embodiment of the present invention to an audio input signal, thereby generating an encoded bit-stream. In one embodiment, the audio encoding technique comprises an augmented version of an LC-SBC encoding technique described in Appendix B of the Advanced Audio Distribution Profile (A2DP) specification (Adopted Version 1.0, May 22, 2003)(referred to herein as "the A2DP specification"), although the invention is not so limited. The encoded bit-stream is transmitted over eSCO link 114. Each of audio decoder 124 and audio decoder 134 is configured to apply an audio decoding technique in accordance with an embodiment of the present invention to the received encoded bit-stream, thereby generating an audio output signal. In one embodiment, the audio decoding technique comprises an augmented version of an LC-SBC decoding technique described in Appendix B of the A2DP specification, although the invention is not so limited.

The audio encoding and decoding techniques respectively applied by audio encoders 122, 132 and audio decoders 124, 134 operate to reduce bandwidth usage over eSCO link 114 and power consumption by first device 102 and third device 106 while maintaining voice quality. As will be described herein, these techniques utilize a low-complexity Voice Activity Detection (VAD) and Comfort Noise Generation (CNG) scheme to help achieve this goal. As noted above, in one embodiment, the audio encoding and decoding techniques comprise augmented versions of LC-SBC audio encoding and decoding techniques. These augmented versions operate to reduce the average bit rate used for transmitting wideband speech in a manner that does not add significant computational complexity. Furthermore, these augmented versions may advantageously be implemented in a manner that does not require any modification of the underlying logic/structure of LC-SBC.

Although an embodiment of the invention described herein comprises an augmented version of LC-SBC, the invention is not so limited. The systems and methods described herein can advantageously be used in any audio codec, and in particular those that operate in the sub-band domain.

Furthermore, the foregoing operating environment of system 100 has been described by way of example only. Persons skilled in the relevant art(s), based on the teachings provided herein, will readily appreciate that the present invention may be implemented in other operating environments. For example, the present invention may be implemented in any system or device that is configured to perform audio encoding or decoding.

C. Conventional Low Complexity Sub-band Coder (LC-SBC)

As noted above, an embodiment of the present invention comprises an augmented version of LC-SBC. To facilitate a better understanding of such an embodiment, a conventional implementation of the LC-SBC codec will now be described in reference to FIGS. 2-4.

Figure 2:
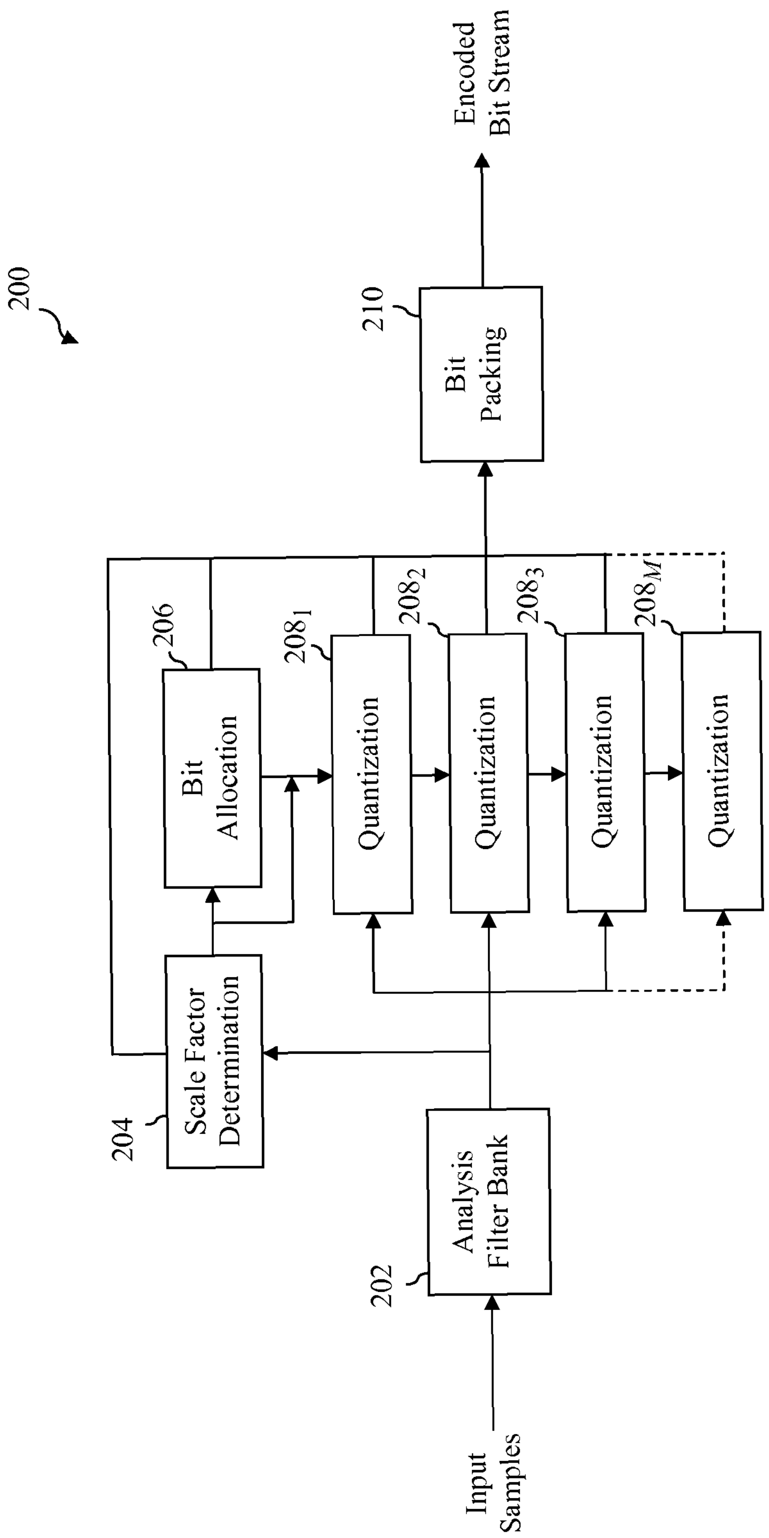
FIG. 2 (Prior Art)
FIG. 2 is a block diagram of a conventional low-complexity sub-band coding (LC-SBC) encoder.

FIG. 2 is a block diagram of a conventional LC-SBC encoder 200. As shown in FIG. 2, LC-SBC encoder 200 includes an analysis filter bank 202, scale factor determination logic 204, bit allocation logic 206, a plurality of quantizers $\mathbf{208}_{1\text{-}M}$ and bit packing logic 210.

Figure 3:
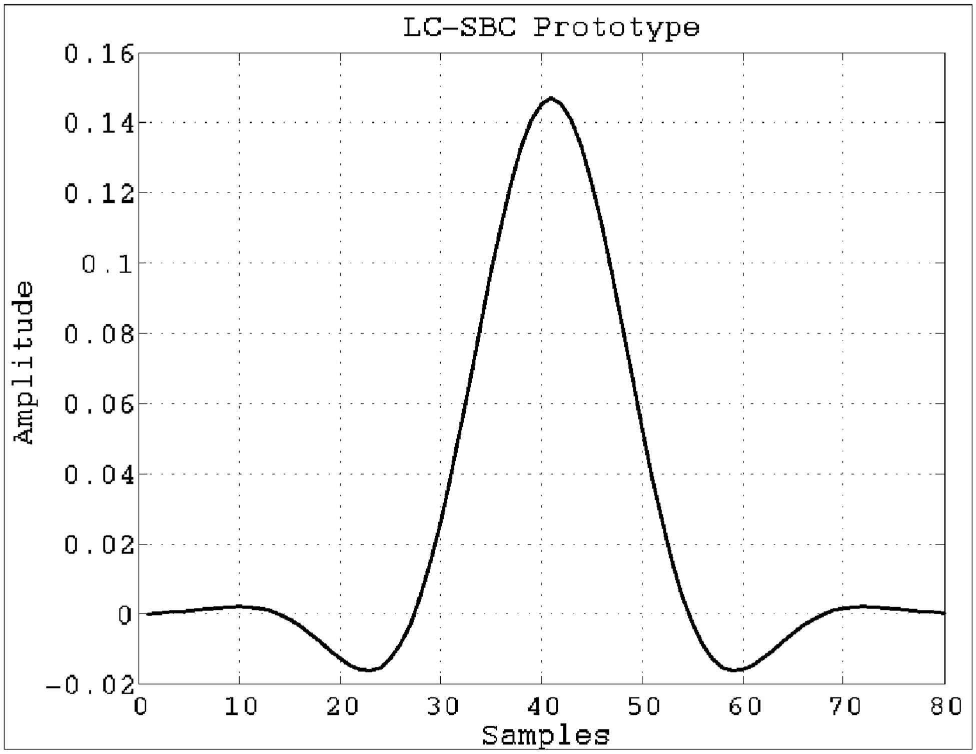
FIG. 3 illustrates a prototype filter used to generate analysis and synthesis filters in a conventional LC-SBC encoder and decoder.

Analysis filter bank 202 receives an audio signal represented by a series of input samples and decomposes the audio signal into a set of 4 or 8 sub-band signals. Analysis filter bank 202 is implemented by means of a cosine-modulated filter bank. A prototype filter is used to generate the individual analysis filters in accordance with equation (1):

$$ha_m[n] = p[n]\cos\left[\left(m+\frac{1}{2}\right)\left(n-\frac{M}{2}\right)\frac{\pi}{M}\right] \quad (1)$$

wherein M represents the number of sub-bands (4 or 8 depending upon the implementation), L represents the filter length and is equal to 10*M, m=[0, M−1], n=[0, L−1], p[n] is the prototype filter, and $ha_m$ is the analysis filter for sub-band m. FIG. 3 depicts a graph 300 that shows the impulse response of the prototype filter p[n].

LC-SBC encoder 200 is configured to operate on a frame of input samples, wherein a frame comprises a configurable number of blocks of M pulse code modulated (PCM) input samples and wherein M represents the number of sub-bands as noted above. The total number of input samples across all blocks in a frame may be denoted N. Analysis filter bank 202 produces M sub-band samples for each block of M PCM input samples. After processing of the input samples by analysis filter bank 202, there are either N/4 sub-band samples for each of 4 sub-bands or N/8 sub-band samples for each of 8 sub-band samples, depending upon the implementation. The encoding process then includes a number of steps.

First, scale factor determination logic 204 determines a scale factor for each sub-band. The scale factor for a given sub-band is the largest absolute value of any sample in that sub-band. Bit allocation logic 206 then determines a number of bits to be allocated to each sub-band. Bit allocation logic 206 may use one of two processes to perform this function depending upon the configuration. One process attempts to improve the ratio between the audio signal and the quantization noise, while the other accounts for human auditory sensitivity. Both processes rely on the scale factor associated with each sub-band and the location of the sub-band to determine how many bits should be dedicated to each sub-band. Regardless of which process is used, bit allocation logic 206 generally allocates larger numbers of bits to lower-frequency sub-bands having larger scale factors.

Each of quantizers $\mathbf{208}_{1\text{-}M}$ receives N/8 or N/4 sub-band samples (depending upon the number of sub-bands) corresponding to a particular sub-band from analysis filter bank 202, a scale factor associated with the particular sub-band from scale factor determination logic 204, and a number of bits to be allocated to the particular sub-band from bit allocation logic 206. Each quantizer quantizes the scale factor by taking the next higher powers of 2. Each quantizer then normalizes the N/8 or N/4 sub-band samples by the quantized scale factor. Then each quantizer quantizes the normalized blocks of sub-band samples in accordance with equation (2):

$$\hat{x}_m[n] = \left(\frac{x_m[n]}{2^{SCF_m}}+1\right)\left(\frac{2^{B_m}}{2}\right) \quad (2)$$

wherein $\hat{x}_m[n]$ and $x_m[n]$ represent the quantized and original normalized sub-band sample n from sub-band m. The quantized scale factor for band m and the number of bits allocated to it are represented by $SCF_m$ and $B_m$, respectively.

Bit packing logic 210 receives bits representative of the quantized scale factors and quantized sub-band samples from each of quantizers $\mathbf{208}_{1\text{-}M}$ and arranges the bits in a manner suitable for transmission to an LC-SBC decoder.

Figure 4:
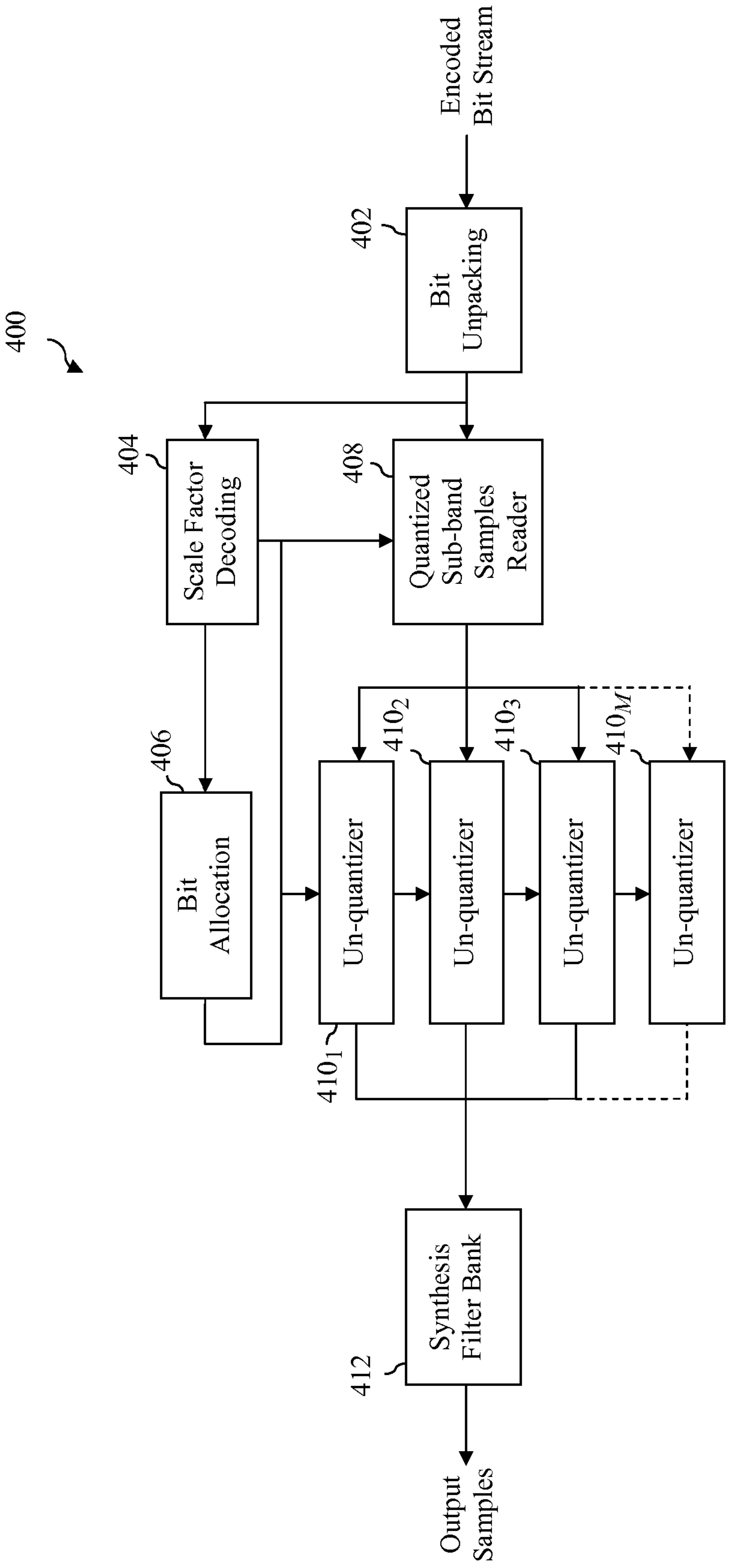
FIG. 4 (Prior Art)
FIG. 4 is a block diagram of a conventional LB-SBC decoder.

FIG. 4 is a block diagram of a conventional LC-SBC decoder 400. As shown in FIG. 4, LC-SBC decoder 400 includes bit unpacking logic 402, scale factor decoding logic 404, bit allocation logic 406, a quantized sub-band samples reader 408, a plurality of un-quantizers $\mathbf{410}_{1\text{-}M}$ and a synthesis filter bank 412.

Bit unpacking logic 402 receives an encoded bit stream from an LC-SBC encoder (such as LC-SBC encoder 200), from which it extracts bits representative of quantized scale factors and quantized sub-band samples.

Scale factor decoding logic 404 receives the quantized scale factors from bit unpacking logic 402 and un-quantizes the quantized scale factors to produce a scale factor for each of 4 or 8 sub-bands, depending upon the implementation. Bit allocation logic 406 receives the scale factors from scale factor decoding logic 404 and operates in a like manner to bit allocation logic 206 of LC-SBC encoder 200 to determine a number of bits to be allocated to each sub-band based on the scale factors and the locations of the sub-bands.

Quantized sub-band samples reader 408 receives the number of bits to be allocated to each sub-band from bit allocation logic 406 and uses this information to properly extract quantized sub-band samples associated with each sub-band from bits provided by bit unpacking logic 402.

Each of un-quantizers $\mathbf{410}_{1\text{-}M}$ receives a number of quantized sub-band samples corresponding to a particular sub-band from quantized sub-band samples reader 408, a quantized scale factor associated with the particular sub-band from bit unpacking logic 402, and a number of bits to be allocated to the particular sub-band from bit allocation logic 406. Using this information, each of un-quantizers $\mathbf{410}_{1\text{-}M}$ operates in an inverse manner to quantizers $\mathbf{208}_{1\text{-}M}$ described above in reference to LC-SBC encoder 200 to produce a number of un-quantized sub-band samples for each sub-band. The number of un-quantized sub-band samples produced for each sub-band may be N/8 where the number of sub-bands is 8 or N/4 where the number of sub-bands is 4.

Synthesis filter bank 412 receives the un-quantized sub-band samples from each of un-quantizers $\mathbf{410}_{1\text{-}M}$ and combines them to produce a frame of N output samples representative of the original audio signal, wherein the frame comprises the configured number of blocks of M PCM output samples and wherein M represents the number of sub-bands. Like analysis filter bank 202 described above in reference to LC-SBC encoder 200, synthesis filter bank 412 is implemented by means of a cosine-modulated filter bank. A prototype filter is used to generate the individual synthesis filters in accordance with equation (3):

$$hs_m[n] = p[n]\cos\left[\left(m+\frac{1}{2}\right)\left(n+\frac{M}{2}\right)\frac{\pi}{M}\right] \quad (3)$$

wherein M represents the number of sub-bands (4 or 8 depending upon the implementation), L represents the filter length and is equal to 10*M, m=[0, M−1], n=[0, L−1], p[n] is the prototype filter, and $hs_m$ is the synthesis filter for sub-band m.

D. Example Audio Codec in Accordance with an Embodiment of the Present Invention An example audio codec in accordance with an embodiment of the present invention will now be described. This embodiment comprises an augmented version of an LC-SBC codec that may be used, for example, to compress/decompress wideband speech signals in a Bluetooth™ wireless communication system. However, as noted above, the audio encoding/decoding methods described herein are not limited to such an implementation and may advantageously be used in any audio encoding/decoding system, and in particular those that operate in the sub-band domain.

Figure 5:
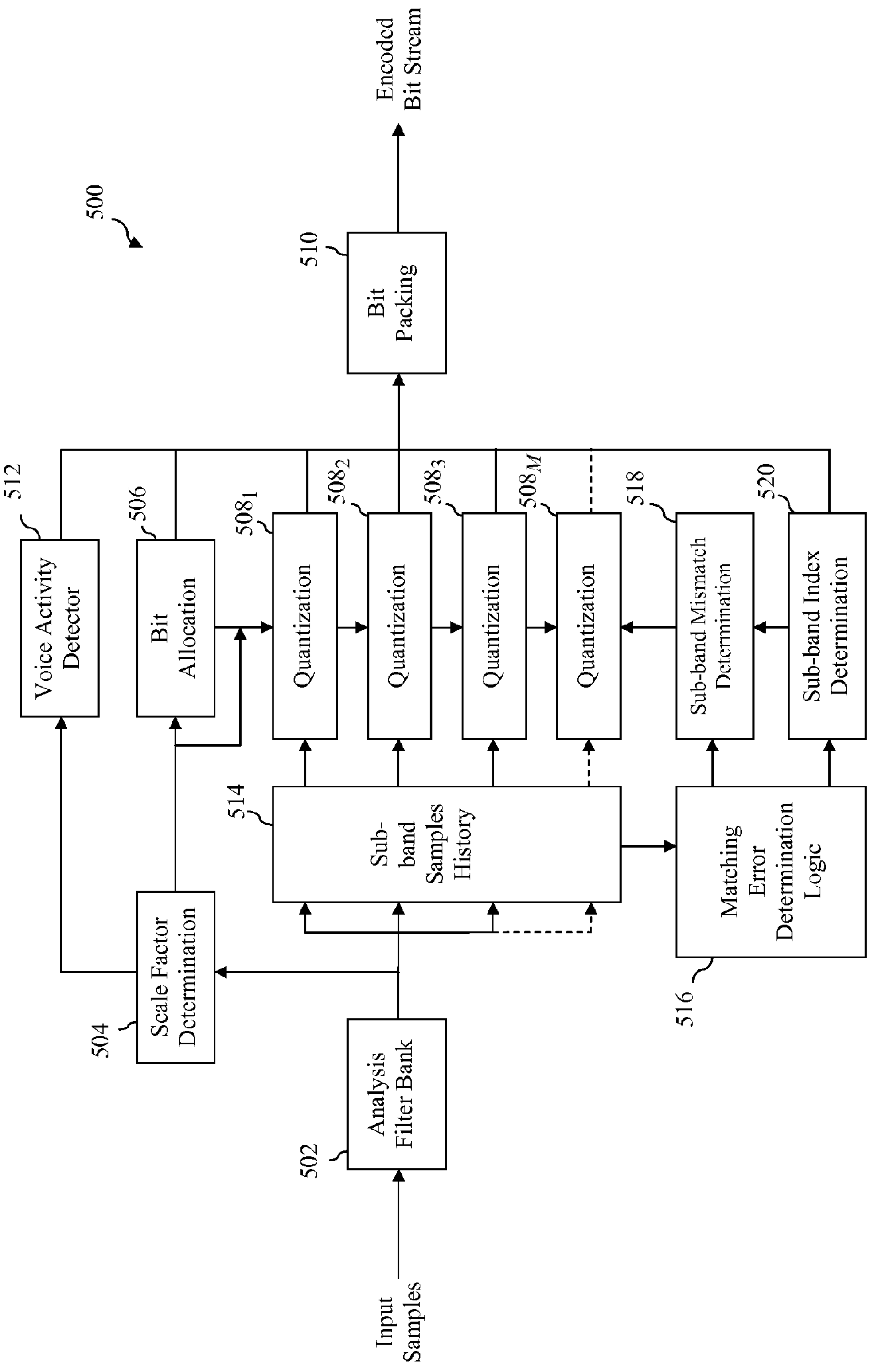
FIG. 5 is a block diagram of an audio encoder in accordance with an embodiment of the present invention.

FIG. 5 is a block diagram of an audio encoder 500 in accordance with an embodiment of the present invention. As shown in FIG. 5, audio encoder includes an analysis filter bank 502, scale factor determination logic 504, bit allocation logic 506, a plurality of quantizers $\mathbf{508}_{1-M}$, bit packing logic 510, a voice activity detector 512, a sub-band samples history buffer 514, matching error determination logic 516, sub-band mismatch determination logic 518 and sub-band index determination logic 520.

Analysis filter bank 502 is configured to operate in a like manner to analysis filter bank 202 described above in reference to conventional LC-SBC encoder 200 of FIG. 2. Thus, analysis filter bank 502 receives an audio signal represented by a frame of N input samples and decomposes the audio signal into a set of 4 or 8 sub-band signals. After processing of the input samples by analysis filter bank 502, there are either N/4 sub-band samples for each of 4 sub-bands or N/8 sub-band samples for each of 8 sub-band samples, depending upon the implementation.

In encoder 500, the un-quantized sub-band samples generated by analysis filter bank 502 are temporarily stored in sub-band samples history buffer 514. In one implementation in which 8 sub-bands are used and N=128, sub-band samples history buffer 514 is configured to store the 256 most-recently generated samples for each sub-band.

Scale factor determination logic 504 is configured to operate in a like manner to scale factor determination logic 204 described above in reference to conventional LC-SBC encoder 200 to determine a scale factor for each sub-band. Bit allocation logic 506 is configured to receive the scale factors from scale factor determination logic 504 and to determine a number of bits to be allocated to each sub-band based on the scale factor associated with the sub-band and the location of the sub-band. Bit allocation logic 506 is configured to operate in a like manner to bit allocation logic 206 of conventional LC-SBC encoder 200 to perform this function.

Voice activity detector 512 is configured to receive one or more of the scale factors from scale factor determination logic 504 and to determine based on the one or more scale factors whether an audio frame currently being encoded is a voice frame or a noise frame. In one implementation, voice activity detector 512 is configured to set the value of a voice activity detection (VAD) decision flag to 1 if the current frame is determined to be a voice frame and to 0 if the current frame is determined to be a noise frame.

In one embodiment, voice activity detector 512 determines whether the audio frame is a voice frame or a noise frame based on the scale factor(s) associated with one or more of the lowest-frequency sub-bands. For speech signals, most of the power is contained below 3000 Hz. Since, for each processing block, the scale factors in LC-SBC represent the largest values in each sub-band, they follow the same contour as the signal power spectrum. Thus, voice activity detector 512 advantageously determines whether an audio frame is a voice frame or noise frame by tracking the level of scale factors in one or more of the lowest-frequency sub-bands.

For example in one implementation, voice activity detector 512 is configured to estimate the level of background noise for each sub-band of interest using a fast attack, slow decay peak tracker. When the difference between the input and estimated noise level exceeds a predetermined threshold amount, voice activity detector 512 declares the current frame a voice frame. Otherwise, voice activity detector 512 declares the current frame a noise frame. It has been observed that using the first two to three sub-bands is sufficient to correctly detect voice frames for signal-to-noise ratio (SNR) values up to approximately 10 decibels (dB).

In a further embodiment, it is possible to enhance voice activity detector 512 by adding, for instance, sub-band stationarity measures to the simple level tracker. This may improve the performance of voice activity detector 512 during the onset and offsets of speech in low SNR cases.

Figure 6:
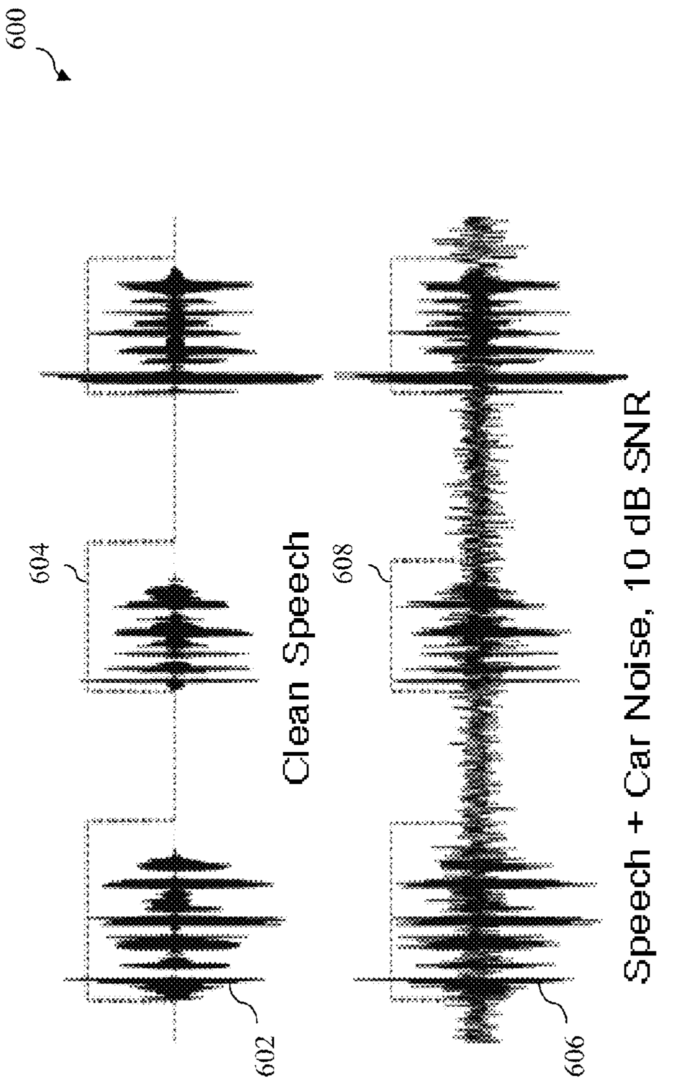
FIG. 6 depicts an example of clean and noisy speech signals, overlaid with a Voice Activity Detection (VAD) decision flag generated by an audio encoder responsive to processing such signals in accordance with an embodiment of the present invention.

FIG. 6 depicts an example of a clean speech signal 602 and a noisy speech signal 606 encoded by audio encoder 500 in accordance with one implementation of the present invention, each of which is overlaid with a corresponding binary VAD decision flag 604 and 608 produced by voice activity detector 512.

If voice activity detector 512 determines that the audio frame currently being encoded is a voice frame, then quantization of the scale factors and the sub-band samples associated with each sub-band in the frame is carried out by quantizers $\mathbf{508}_{1-M}$ in a like manner to that described above in reference to quantizers $\mathbf{208}_{1-M}$ of LC-SBC encoder 200 of FIG. 2. Bit packing logic 510 then receives bits representative of the quantized scale factors and quantized sub-band samples from each of quantizers $\mathbf{508}_{1-M}$ and arranges the bits in a manner suitable for transmission to an audio decoder in a like manner to bit packing logic 210 as described above in reference to LC-SBC encoder 200.

However, if voice activity detector 512 determines that the audio frame currently being encoded is a noise frame, then encoding of the frame is carried out in accordance with a comfort noise generation scheme that will now be described.

Some conventional speech codecs that synthesize comfort noise attempt to model the background noise by estimating the noise level, and possibly spectral envelope, at the encoder. A coarsely quantized version of the estimates is then communicated to the decoder. An embodiment of the present invention beneficially exploits the correlation in the short term history of the background noise that is available to both the encoder and the decoder. If the current background noise can be closely approximated using the information in the history, then encoder 500 finds the time index providing the best match for each sub-band and communicates it to the decoder. This is achieved, in part, by adding a sub-band samples history buffer to both encoder 500 and to a corresponding decoder.

In an embodiment, since the contents of the history buffers is used to model the background noise, voice activity detector 512 is configured such that a short hangover period applies during voice-to-noise transitions. In other words, voice activity detector 512 is configured to declare a noise frame only after a certain number of frames determined to comprise noise have been received following a period of voice frames. This allows the decoder to populate its sub-band samples history buffer with the most recent noise samples in a manner that is synchronized with encoder 500.

For frames that have been declared noise frames by voice activity detector 512, encoder 500 finds a best waveform match from history buffer 514 for each sub-band. In the embodiment depicted in FIG. 5, this function is performed in part by matching error determination logic 516. In particular, matching error determination logic 516 operates to calculate for each sub-band a matching error between a current series of sub-band samples produced by analysis filter bank 502 and sets of consecutive sub-band samples stored in history buffer 514 for the same sub-band, wherein the sets of consecutive sub-band samples are identified using a sliding window without regard to frame boundaries. The beginning of each set of consecutive sub-band samples in history buffer 514 is identified using a time index.

The matching error can be computed, for example, using a common normalized cross correlation or the average magnitude difference function shown in equation (4):

$$k=\arg\min\|s_m(i)-\hat{s}_m(i-k))\| \quad (4)$$

where $s_m(i)$ represents the un-quantized sample from sub-band m at block i and $\hat{s}_m(i-k)$ represent the un-quantized sub-band samples from the history buffer at time index k.

Based on the calculations performed by matching error determination logic 516, sub-band index determination logic 520 operates to determine the time index that minimizes the matching error for each sub-band. Thus, for each sub-band, the determined time index identifies the best-matching waveform for that sub-band within history buffer 512.

Based on the calculations performed by matching error determination logic 516 and the time indices determined by sub-band index determination logic 520, sub-band mismatch determination logic 518 identifies the sub-band having the largest mismatch error at the time index determined for the sub-band by sub-band index determination logic 520. In one embodiment, the mismatch error for each sub-band is weighted based on the position of the sub-band, such that sub-band mismatch determination logic 518 identifies the sub-band having the largest weighted mismatch error. The weighting may be biased toward lower-frequency sub-bands.

Encoding of a noise frame then proceeds as follows. For the sub-band identified by sub-band mismatch determination logic 518, the scale factor and sub-band samples are quantized by the corresponding sub-band quantizer from among quantizers $\mathbf{508}_{1\text{-}M}$ in a like manner to that described above in reference to quantizers $\mathbf{208}_{1\text{-}M}$ of conventional LC-SBC encoder 200. However, the sub-band samples are quantized using a fixed number of allocated bits in order to maintain a constant bit-rate for all noise frames. The encoded bits representing the quantized scale factor and sub-band samples as well as an identifier of the relevant sub-band are provided to bit packing logic 510. In one embodiment, a 4-bit representation is used to identify the relevant sub-band.

For each sub-band not identified by sub-band mismatch determination logic 520, the time index determined by sub-band index determination logic 520 is provided to bit packing logic 510. In one embodiment, an 8-bit representation of each time index is used.

Bit packing logic 510 receives the encoded bits from the active quantizer from among quantizers $\mathbf{508}_{1\text{-}M}$ and the encoded time indices from sub-band index determination logic 520 as described above and arranges the bits in a manner suitable for transmission to an audio decoder.

Figure 7:
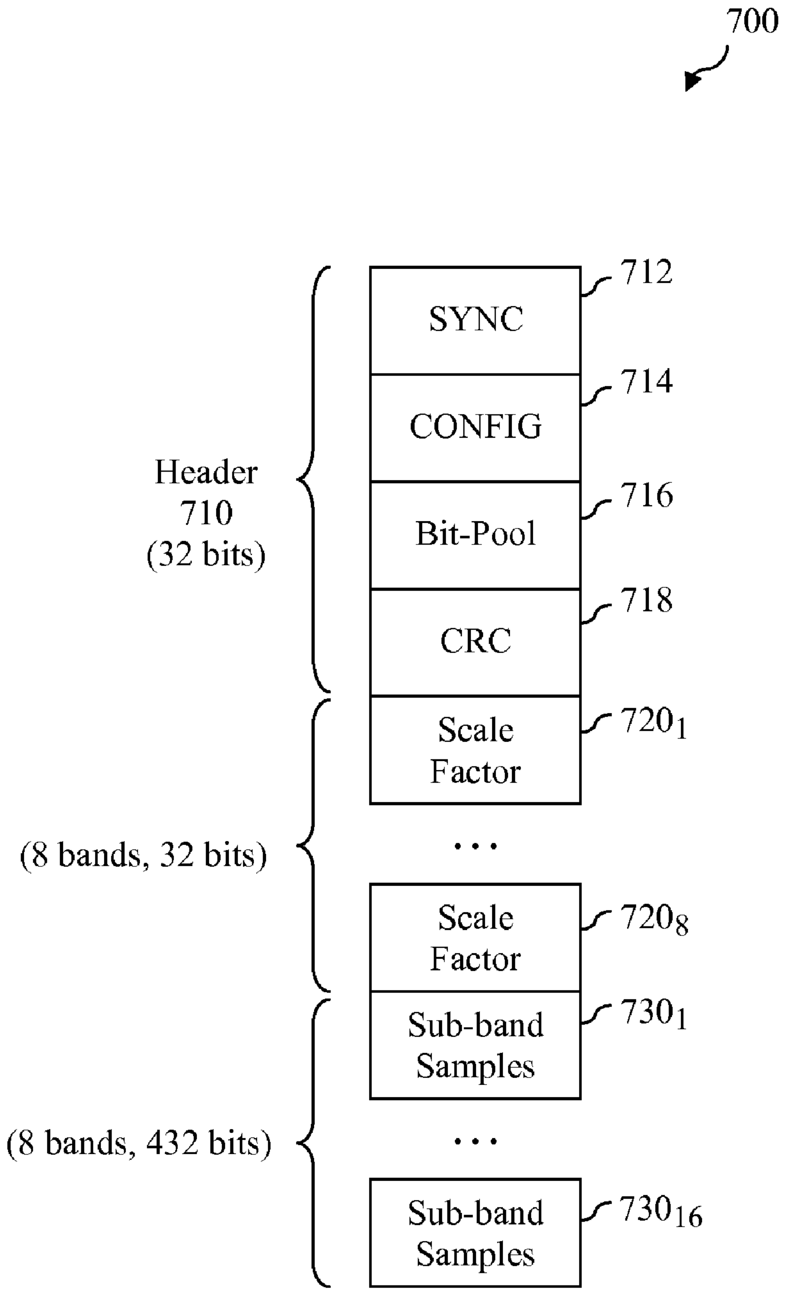
FIG. 7 illustrates the format of a voice packet generated by an embodiment of the present invention.

FIG. 7 illustrates a format of a voice packet 700 generated by an implementation of audio encoder 500 in which the number of sub-bands is 8, the number of blocks per frame is 16, and the number of bits to be allocated across the sub-bands in each block (denoted "bit-pool") is 27. As shown in FIG. 7, voice packet 700 includes a header 710, eight quantized scale factors $\mathbf{720}_{1\text{-}8}$ corresponding to the 8 sub-bands, and 16 sets of quantized sub-band samples $\mathbf{730}_{1\text{-}16}$ corresponding to the 16 blocks. Header 710 comprises an 8-bit synchronization (SYNC) word 712, 8 bits of configuration (CONFIG) data, an 8-bit bit-pool value, and an 8-bit cyclic redundancy check (CRC) value, for a total of 32 bits. Each of quantized scale factors $\mathbf{720}_{1\text{-}8}$ is represented by a 4-bit value, such that quantized scale factors $\mathbf{720}_{1\text{-}8}$ are represented by 32 bits. Each set of quantized sub-band samples $\mathbf{730}_{1\text{-}16}$ is represented by 27 bits in accordance with the specified bit-pool value such that quantized sub-band samples $\mathbf{730}_{1\text{-}16}$ are represented by 432 bits. The total size of voice packet 700 is thus 496 bits.

Figure 8:
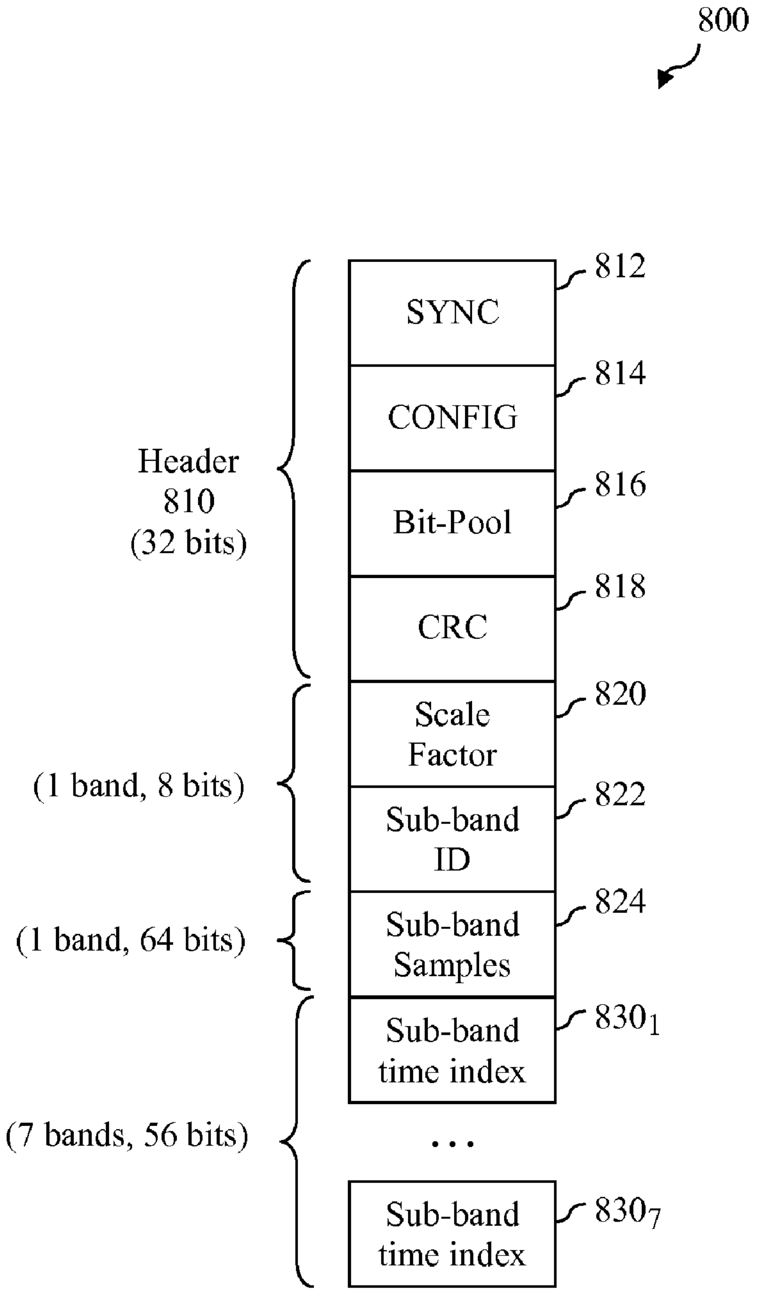
FIG. 8 illustrates the format of a noise packet generated by an embodiment of the present invention.

FIG. 8 illustrates, in contrast, a format of a noise packet 800 generated by a like implementation of audio encoder 500. As shown in FIG. 8, noise packet 800 includes a 32-bit header 810 that is formatted in a like manner to header 710 of voice packet 700. However, encoder 500 denotes a noise packet by inserting a value of zero in bit-pool portion 816 of header 810. A standard LC-SBC packet will normally carry a positive value in this field. This advantageously allows an audio decoder in accordance with an embodiment of the present invention to distinguish noise packets from voice packets.

Noise packet 800 further includes a 4-bit quantized scale factor 820, a 4-bit sub-band identifier 822 and quantized sub-band samples 824 associated with the only sub-band for which sub-band samples were encoded. In this implementation of audio encoder 500, encoding of each sub-band sample was carried out using 4 bits, such that quantized sub-band samples 824 is represented by 64 bits. Noise packet 800 further includes 7 encoded time indices $\mathbf{830}_{1\text{-}7}$ corresponding to the 7 sub-bands for which sub-band samples were not encoded. Each time index is encoded using 8 bits, such that time indices $\mathbf{830}_{1\text{-}7}$ are represented by 56 bits. The total size of noise packet 800 is thus 160 bits.

It can be seen from the foregoing that noise packets are substantially shorter than voice packets. As a result, the selective transmission of noise packets instead of voice packets by an embodiment of the present invention will substantially reduce the bandwidth consumed across the communication link used to carry such packets. The transmission of shorter packets also reduces the amount of power consumed by the physical layer components of both the transmitter and receiver (e.g., radio frequency (RF) components).

Figure 9:
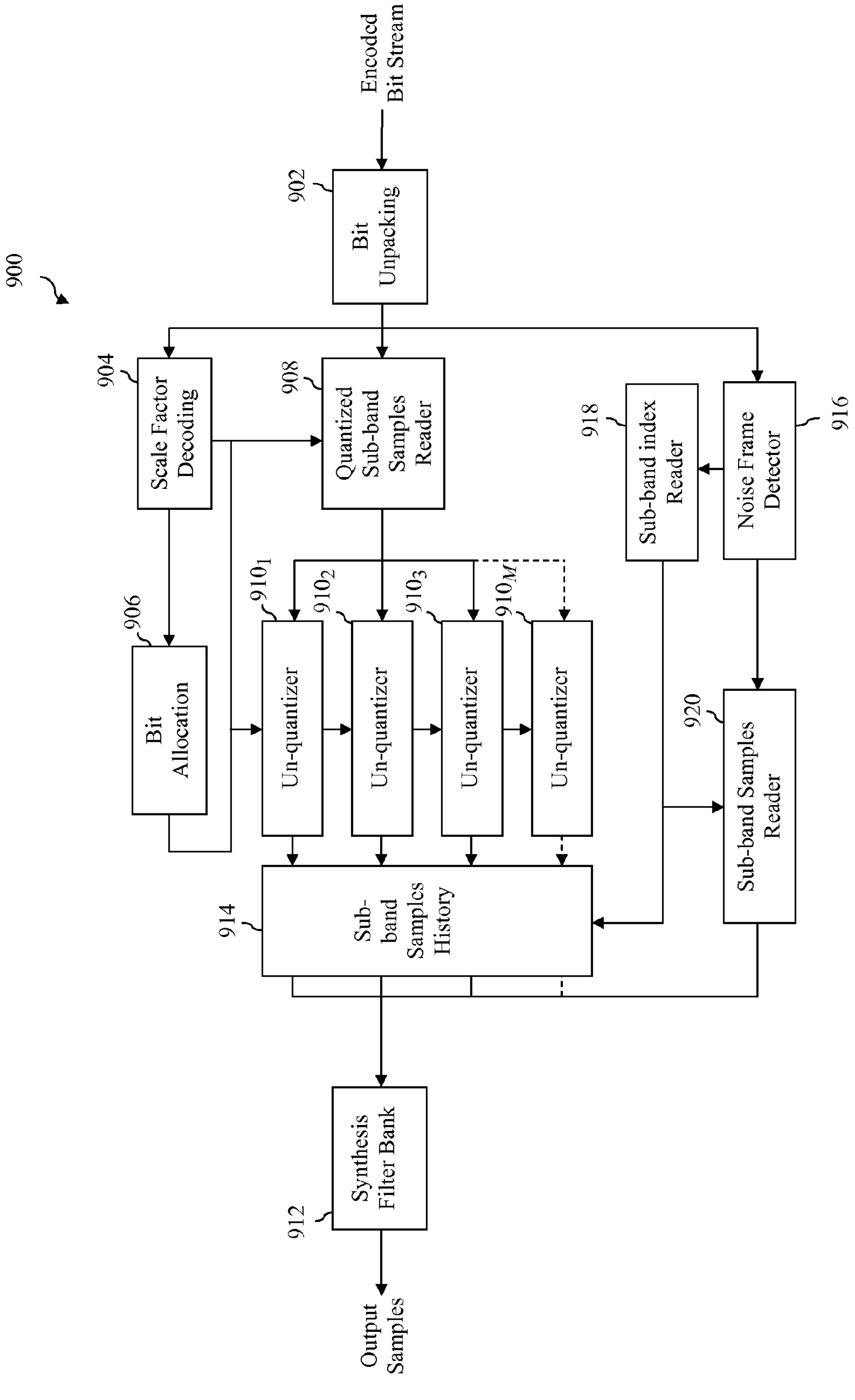
FIG. 9 is a block diagram of an audio decoder in accordance with an embodiment of the present invention.

FIG. 9 is a block diagram of an audio decoder 900 in accordance with an embodiment of the present invention. As shown in FIG. 9, audio decoder 900 includes bit unpacking logic 902, scale factor decoding logic 904, bit allocation logic 906, a quantized sub-band samples reader 908, a plurality of un-quantizers $\mathbf{910}_{1\text{-}M}$, a synthesis filter bank 912, a sub-band samples history buffer 914, a noise frame detector 916, a sub-band index reader 918 and a sub-band samples reader 918.

Bit unpacking logic 902 receives an encoded bit stream from an audio encoder in accordance with an embodiment of the present invention (such as audio encoder 500), from which it extracts bits for decoding. The manner in which the encoded bit stream is decoded is based on whether the encoded bit stream comprises a voice frame or a noise frame. This determination is made by noise frame detector 916.

If the encoded bit stream comprises a voice frame, then decoding proceeds as follows. Scale factor decoding logic 904 receives quantized scale factors from bit unpacking logic 402 and operates in a like manner to scale factor decoding logic 404 of LC-SBC decoder 400 to produce an un-quantized scale factor for each of 4 or 8 sub-bands, depending upon the implementation. Bit allocation logic 906 receives the decoded scale factors from scale factor decoding logic 904 and operates in a like manner to bit allocation logic 406 of LC-SBC decoder 400 to determine a number of bits to be allocated to each sub-band based on the scale factors and the locations of the sub-bands. Quantized sub-band samples reader 908 receives the number of bits to be allocated to each sub-band from bit allocation logic 906 and operates in a like manner to quantized sub-band samples reader 408 of LC-SBC decoder 400 to properly extract quantized sub-band samples associated with each sub-band from bits provided by bit unpacking logic 902. Each of un-quantizers $\mathbf{910}_{1\text{-}M}$ receives a number of quantized sub-band samples corresponding to a particular sub-band from quantized sub-band samples reader 908, a quantized scale factor associated with the particular sub-band from bit unpacking logic 902, and a number of bits to be allocated to the particular sub-band from bit allocation logic 906. Using this information, each of un-quantizers $\mathbf{910}_{1\text{-}M}$ operates in a like manner to un-quantizers $\mathbf{410}_{1\text{-}M}$ described above in reference to LC-SBC decoder 400 to produce a number of un-quantized sub-band samples for each sub-band. The number of un-quantized sub-band samples produced for each sub-band may be N/8 where the number of sub-bands is 8 or N/4 where the number of sub-bands is 4. Synthesis filter bank 912 receives the un-quantized sub-band samples from each of un-quantizers $\mathbf{910}_{1\text{-}M}$ and operates in a like manner to synthesis filter bank 412 of LC-SBC decoder 400 to produce a frame of N output samples representative of the original audio signal.

During processing of a voice frame, the un-quantized sub-band samples produced for each sub-band by un-quantizers $\mathbf{910}_{1\text{-}M}$ are temporarily stored in sub-band samples history buffer 914. In one implementation in which 8 sub-bands are used and N=128, sub-band samples history buffer 914 is configured to store the 256 most-recently generated samples for each sub-band.

If the encoded bit stream comprises a noise frame, then decoding proceeds as follows. Quantized sub-band samples reader 908 receives an identifier from bit unpacking logic 902 that identifies one of 4 or 8 sub-bands for which a quantized scale factor and quantized sub-band samples were received. Quantized sub-band samples reader 908 then extracts the quantized scale factor and quantized sub-band samples from the encoded bit stream and provides this information to the one un-quantizer among un-quantizers $\mathbf{910}_{1\text{-}M}$ that is associated with the identified sub-band. The selected un-quantizer operates to produce a set of un-quantized sub-band samples associated with the identified sub-band based on the quantized scale factor, the quantized sub-band samples and a fixed number of allocated bits. The un-quantized sub-band samples are used to update sub-band samples history buffer 914 and are also passed to synthesis filter bank 912. The number of un-quantized sub-band samples produced for the relevant sub-band may be N/8 where the number of sub-bands is 8 or N/4 where the number of sub-bands is 4.

During decoding of a noise frame, sub-band index reader 918 also operates to receive and decode an encoded time index associated with all but one of the sub-bands from bit unpacking logic 902. Based on the time index associated with each sub-band, sub-band samples reader 920 identifies a set of consecutive un-quantized sub-band samples stored within sub-band samples history buffer 914 for each sub-band and provides the identified sub-band samples to synthesis filter bank 912. The number of un-quantized sub-band samples identified for each sub-band may be N/8 where the number of sub-bands is 8 or N/4 where the number of sub-bands is 4. Synthesis filter bank 912 operates to combine the sub-band samples received from sub-band samples reader 920 with the sub-band samples received from the selected one of un-quantizers $\mathbf{910}_{1\text{-}M}$ to produce a frame of N output samples representative of the original audio signal.

Figure 10:
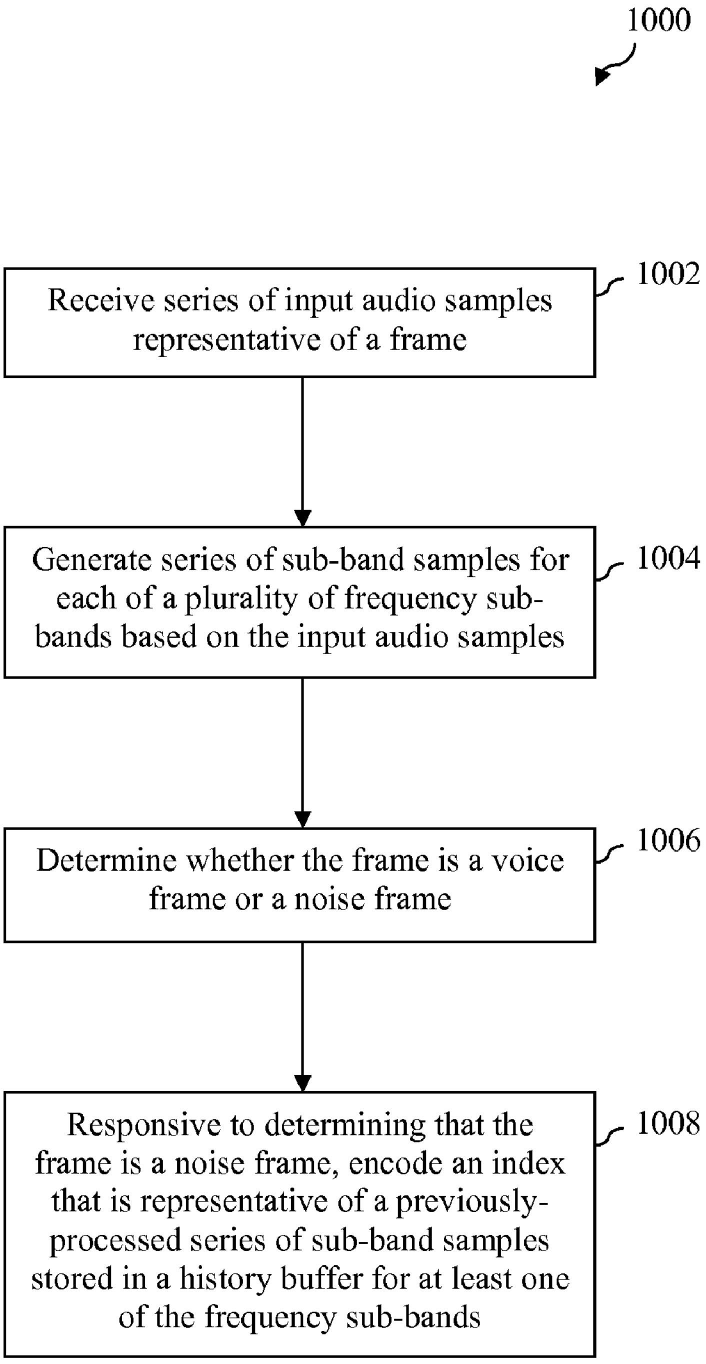
FIG. 10 depicts a flowchart of a method for encoding a frame of an audio signal in accordance with an embodiment of the present invention.

E. Example Audio Encoding and Decoding Methods in Accordance with Embodiments of the Present Invention An example of a general method for encoding a frame of an audio signal in accordance with an embodiment of the present invention will now be described in reference to flowchart 1000 of FIG. 10. This method may be implemented, for example, by audio encoder 500 as described above in reference to FIG. 5. However, the method is not limited to that implementation.

As shown in flowchart 1000, the method begins at step 1002, in which a series of input audio samples representative of the frame are received.

At step 1004, a series of sub-band samples for each of a plurality of frequency sub-bands are generated based on the input audio samples. This step may be performed, for example, by analysis filter bank 502 of audio encoder 500.

At step 1006, a determination is made as to whether the frame is a voice frame or a noise frame. This step may be performed, for example, by voice activity detector 512 of audio encoder 500.

At step 1008, responsive to determining that the frame is a noise frame, an index is encoded that is representative of a previously-processed series of sub-band samples stored in a history buffer for at least one of the frequency sub-bands. This step is performed instead of encoding the series of sub-band samples generated for the frequency sub-band. This step may be performed, for example, by sub-band index determination logic 520 of audio encoder 500, while the referenced history buffer may be sub-band samples history buffer 514 of audio encoder 500.

The foregoing method of flowchart 1000 may further include encoding each series of sub-band samples generated for each frequency sub-band responsive to a determination that the frame is a voice frame. The foregoing method of flowchart 1000 may also include storing in the history buffer each series of sub-band samples generated for each frequency sub-band responsive to a determination that the frame is a voice frame. At least one manner by which these operations may be performed was described above in reference to example audio encoder 500.

The foregoing method of flowchart 1000 may also include determining a scale factor for each frequency sub-band based on the sub-band samples generated for each frequency sub-band. This step may be performed, for example, by scale factor determination logic 504 of audio encoder 500. In accordance with such an implementation, step 1006 may include determining if the frame is a voice frame or a noise frame based on at least one or more of the scale factors.

For example, step 1006 may include determining if the frame is a voice frame or a noise frame based on at least one or more of the scale factors corresponding to one or more lowest-frequency sub-bands from among the plurality of frequency sub-bands. As a further example, step 1006 may include determining an estimated noise level for a particular frequency sub-band, determining an input noise level for the particular frequency sub-band based on at least the scale factor corresponding to the particular frequency sub-band, and determining that the frame is a voice frame if the input noise level exceeds the estimated noise level by a predetermined amount. The determination of the estimated noise level may be based on scale factors previously associated with the particular frequency sub-band during encoding of previously-received frames of the audio signal.

The foregoing method of flowchart 1000 may also include determining the index or indices that are encoded in step 1008. In one implementation, determining the index with respect to a particular frequency sub-band includes a number of steps. First, a matching error is determined between the series of sub-band samples generated for the particular frequency sub-band and each of a plurality of previously-processed series of sub-band samples stored in the history buffer for the particular frequency sub-band, wherein each previously-processed series of sub-band samples is identified by an index. Determining the matching error may include determining a normalized cross correlation error or an average magnitude difference as previously described. This step may be performed, for example, by matching error determination logic 516 of audio encoder 500. Then, the index corresponding to the previously-processed series of sub-band samples that produces the smallest matching error is selected. This step may be performed, for example, by sub-band index determination logic 520 of audio encoder 500.

The foregoing method of flowchart 1000 may also include the performance of a number of additional steps responsive to a determination that the frame is a noise frame. First, for each frequency sub-band, a minimum matching error is determined between the series of sub-band samples generated for the frequency sub-band and each of a plurality of previously-processed series of sub-band samples stored in the history buffer for the frequency sub-band. This step may be performed, for example, by matching error determination logic 516 of audio encoder 500. Second, the frequency sub-band having the largest minimum matching error is identified. This step may be performed, for example, by sub-band mismatch determination logic 518. The series of sub-band samples generated for the identified frequency sub-band are then encoded. This step may be performed, for example, by a selected one of quantizers 508$_{1-M}$ within audio encoder 500. In accordance with such an embodiment, step 1008 may include encoding an index representative of a previously-processed series of sub-band samples stored in the history buffer for every frequency sub-band except for the identified frequency sub-band. In further accordance with this implementation, the series of sub-band samples generated for the identified frequency sub-band may be stored in the history buffer.

An example of a general method for decoding an encoded frame of an audio signal in accordance with an embodiment of the present invention will now be described in reference to flowchart 1100 of FIG. 11. This method may be implemented, for example, by audio decoder 900 as described above in reference to FIG. 9. However, the method is not limited to that implementation.

Figure 11:
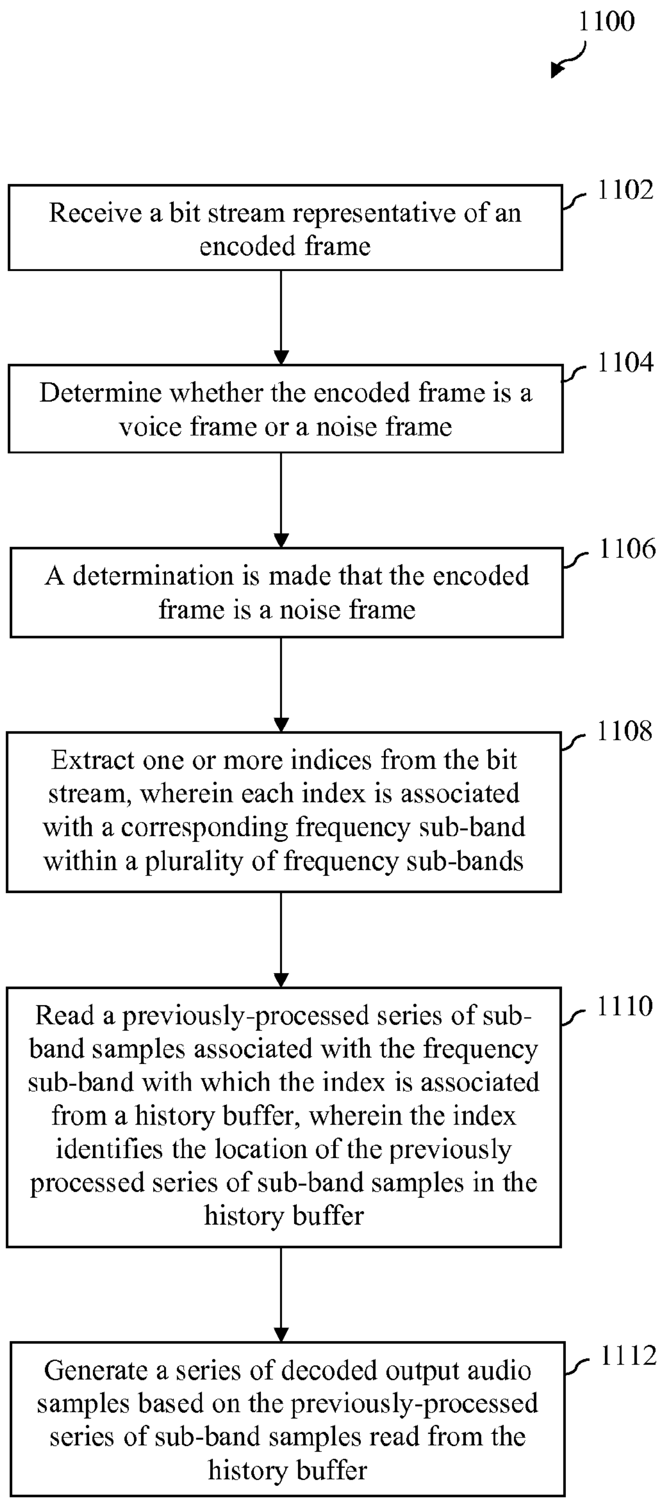
FIG. 11 depicts a flowchart of a method for decoding an encoded frame of an audio signal in accordance with an embodiment of the present invention.

As shown in FIG. 11, the method of flowchart 1100 begins at step 1102, in which a bit stream representative of the encoded frame is received.

At step 1104, a determination is made as to whether the encoded frame is a voice frame or a noise frame. This step may be performed, for example, by noise frame detector 916 of audio decoder 900. Step 1106 indicates that for the purposes of this example a determination is made that the encoded frame is a noise frame. Responsive to this determination, subsequent steps 1108, 1110 and 1112 are performed.

During step 1108, one or more indices are extracted from the bit stream, wherein each index is associated with a corresponding frequency sub-band within a plurality of frequency sub-bands. This step may be performed, for example, by sub-band index reader 918 of audio decoder 900. Extracting one or more indices from the bit stream may include extracting one or more encoded indices from the bit stream and decoding each of the one or more encoded indices.

During step 1110, for each index, a previously-processed series of sub-band samples associated with the frequency sub-band with which the index is associated is read from a history buffer, wherein the index identifies the location of the previously processed series of sub-band samples in the history buffer. This step may be performed, for example, by sub-band samples reader 920 of audio decoder 900. The referenced history buffer may be sub-band samples history buffer 914 of audio decoder 900.

During step 1112, a series of decoded output audio samples is generated based on the previously-processed series of sub-band samples read from the history buffer. This step may be performed, for example, by synthesis filter bank 912 of audio decoder 900.

The foregoing method of flowchart 1100 may further include the following steps that are performed responsive to a determination that the encoded frame is a voice frame. First, an encoded series of sub-band samples corresponding to each of the plurality of frequency sub-bands is extracted from the bit stream. Then, each of the encoded series of sub-band samples is decoded to generate a corresponding decoded series of sub-band samples. Then, the decoded series of sub-band samples are combined to generate a series of decoded output audio samples. The decoded series of sub-band samples may also be stored in the history buffer. At least one manner by which these operations may be performed was described above in reference to example audio decoder 900.

The foregoing method of flowchart 1100 may also include the following steps that are performed responsive to a determination that the encoded frame is a noise frame. First, an identifier of one of a plurality of frequency sub-bands is extracted from the encoded bit stream. Then an encoded series of sub-band samples is extracted from the encoded bit stream. Then, the encoded series of sub-band samples is decoded in an un-quantizer associated with the frequency sub-band identified by the identifier to generate a corresponding decoded series of sub-band samples. This step may be performed, for example, by a selected one of un-quantizers 910$_{1-M}$ of audio decoder 900. Then, the decoded series of sub-band samples are combined with the previously-processed series of sub-band samples read from the history buffer to generate the series of decoded output audio samples. This step may be performed, for example, by synthesis filter bank 912. Furthermore, the decoded series of sub-band samples may also be stored in the history buffer.

F. Example Computer Implementation

Figure 12:
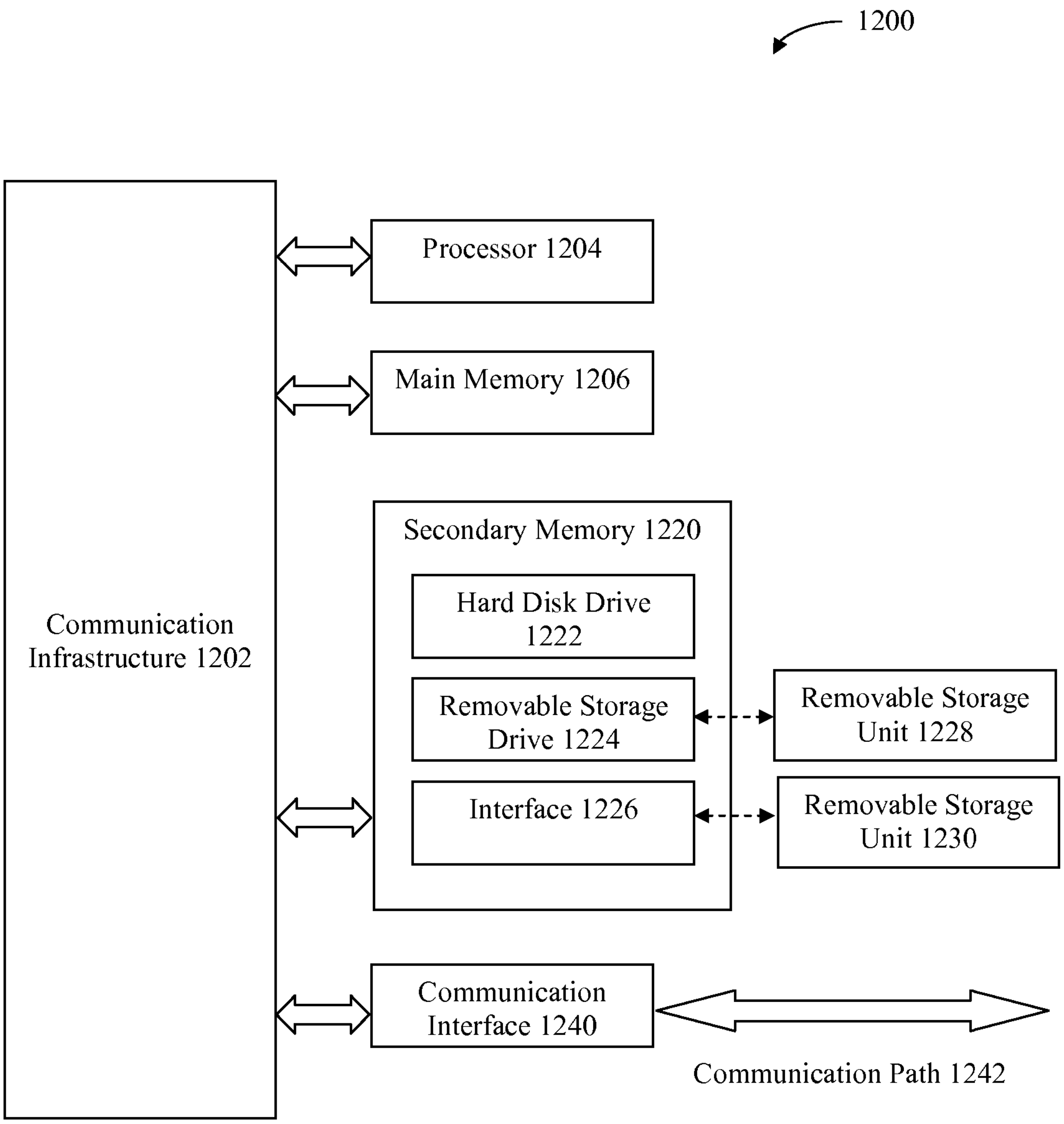
FIG. 12 is a block diagram of a computer system that may be used to implement features of the present invention.

The following description of a general purpose computer system is provided for the sake of completeness. The present invention can be implemented in hardware, or as a combination of software and hardware. Consequently, the invention may be implemented in the environment of a computer system or other processing system. An example of such a computer system 1200 is shown in FIG. 12.

Computer system 1200 includes one or more processors, such as processor 1204. Processor 1204 can be a special purpose or a general purpose digital signal processor. Processor 1204 is connected to a communication infrastructure 1202 (for example, a bus or network). Various software implementations are described in terms of this exemplary computer system. After reading this description, it will become apparent to a person skilled in the relevant art(s) how to implement the invention using other computer systems and/or computer architectures.

Computer system 1200 also includes a main memory 1206, preferably random access memory (RAM), and may also include a secondary memory 1220. Secondary memory 1220 may include, for example, a hard disk drive 1222 and/or a removable storage drive 1224, representing a floppy disk drive, a magnetic tape drive, an optical disk drive, or the like. Removable storage drive 1224 reads from and/or writes to a removable storage unit 1228 in a well known manner. Removable storage unit 1228 represents a floppy disk, magnetic tape, optical disk, or the like, which is read by and written to by removable storage drive 1224. As will be appreciated by persons skilled in the relevant art(s), removable storage unit 1228 includes a computer usable storage medium having stored therein computer software and/or data.

In alternative implementations, secondary memory 1220 may include other similar means for allowing computer programs or other instructions to be loaded into computer system 1200. Such means may include, for example, a removable storage unit 1230 and an interface 1226. Examples of such means may include a program cartridge and cartridge interface (such as that found in video game devices), a removable memory chip (such as an EPROM, or PROM) and associated socket, and other removable storage units 1230 and interfaces 1226 which allow software and data to be transferred from removable storage unit 1230 to computer system 1200.

Computer system 1200 may also include a communications interface 1240. Communications interface 1240 allows software and data to be transferred between computer system 1200 and external devices. Examples of communications interface 1240 may include a modem, a network interface (such as an Ethernet card), a communications port, a PCM-CIA slot and card, etc. Software and data transferred via communications interface 1240 are in the form of signals which may be electronic, electromagnetic, optical, or other signals capable of being received by communications interface 1240. These signals are provided to communications interface 1240 via a communications path 1242. Communications path 1242 carries signals and may be implemented using wire or cable, fiber optics, a phone line, a cellular phone link, an RF link and other communications channels.

As used herein, the terms "computer program medium" and "computer usable medium" are used to generally refer to media such as removable storage units 1228 and 1230 or a hard disk installed in hard disk drive 1222. These computer program products are means for providing software to computer system 1200.

Computer programs (also called computer control logic) are stored in main memory 1206 and/or secondary memory 1220. Computer programs may also be received via communications interface 1240. Such computer programs, when executed, enable the computer system 1200 to implement the present invention as discussed herein. In particular, the computer programs, when executed, enable processor 1200 to implement the processes of the present invention, such as any of the methods described herein. Accordingly, such computer programs represent controllers of the computer system 1200. Where the invention is implemented using software, the software may be stored in a computer program product and loaded into computer system 1200 using removable storage drive 1224, interface 1226, or communications interface 1240.

In another embodiment, features of the invention are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

G. Conclusion

While various embodiments of the present invention have been described above, it should be understood that they have been presented by way of example only, and not limitation. It will be understood by those skilled in the relevant art(s) that various changes in form and details may be made to the embodiments of the present invention described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for encoding a frame of an audio signal, comprising:

receiving a series of input audio samples representative of the frame;

generating a series of sub-band samples for each of a plurality of frequency sub-bands based on the input audio samples;

determining if the frame is a voice frame or a noise frame; and responsive to determining that the frame is a noise frame, encoding an index representative of a previously-processed series of sub-band samples stored in a history buffer located in an encoder that encodes the frame of the audio signal for at least one of the frequency sub-bands instead of encoding the series of sub-band samples generated for the frequency sub-band.

2. The method of claim 1, further comprising encoding each series of sub-band samples generated for each frequency sub-band responsive to determining that the frame is a voice frame.

3. The method of claim 1, further comprising storing in the history buffer each series of sub-band samples generated for each frequency sub-band responsive to determining that the frame is a voice frame.

4. The method of claim 1, further comprising:

determining a scale factor for each frequency sub-band based on the sub-band samples generated for each frequency sub-band;

wherein determining if the frame is a voice frame or a noise frame comprises determining if the frame is a voice frame or a noise frame based on at least one or more of the scale factors.

5. The method of claim 4, wherein determining if the frame is a voice frame or a noise frame based on at least one or more of the scale factors comprises:

determining if the frame is a voice frame or a noise frame based on at least one or more of the scale factors corresponding to one or more lowest-frequency sub-bands from among the plurality of frequency sub-bands.

6. The method of claim 4, wherein determining if the frame is a voice frame or a noise frame based on at least one or more of the scale factors comprises:

determining an estimated noise level for a particular frequency sub-band; determining an input noise level for the particular frequency sub-band based on at least the scale factor corresponding to the particular frequency sub-band; and determining that the frame is a voice frame if the input noise level exceeds the estimated noise level by a predetermined amount.

7. The method of claim 6, wherein determining the estimated noise level for the particular frequency sub-band comprises:

determining the estimated noise level for the particular frequency sub-band based on scale factors previously associated with the particular frequency sub-band during encoding of previously-received frames of the audio signal.

8. The method of claim 1, further comprising:

determining the index representative of the previously-processed series of sub-band samples stored in the history buffer for the at least one of the frequency sub-bands, wherein determining the index with respect to a particular frequency sub-band comprises determining a matching error between the series of sub-band samples generated for the particular frequency sub-band and each of a plurality of previously-processed series of sub-band samples stored in the history buffer for the particular frequency sub-band, wherein each previously-processed series of sub-band samples is identified by an index; and selecting the index corresponding to the previously-processed series of sub-band samples that produces the smallest matching error.

9. The method of claim 8, wherein determining the matching error comprises determining a normalized cross correlation error between the series of sub-band samples generated for the particular frequency sub-band and each of the plurality of previously-processed series of sub-band samples stored in the history buffer for the particular frequency sub-band.

10. The method of claim 8, wherein determining the matching error comprises determining an average magnitude difference between the series of sub-band samples generated for the particular frequency sub-band and each of the plurality of previously-processed series of sub-band samples stored in the history buffer for the particular frequency sub-band.

11. The method of claim 1, further comprising:

responsive to determining that the frame is a noise frame, for each frequency sub-band, determining a minimum matching error between the series of sub-band samples generated for the frequency sub-band and each of a plurality of previously-processed series of sub-band samples stored in the history buffer for the frequency sub-band, identifying the frequency sub-band having the largest minimum matching error, and encoding the series of sub-band samples generated for the identified frequency sub-band;

wherein encoding the index representative of the previously-processed series of sub-band samples stored in the history buffer for the at least one of the frequency sub-bands comprises encoding an index representative of a previously-processed series of sub-band samples stored in the history buffer for every frequency sub-band except for the identified frequency sub-band.

12. The method of claim 11, further comprising:

responsive to determining that the frame is a noise frame, storing the series of sub-band samples generated for the identified frequency sub-band in the history buffer.

13. A method for decoding an encoded frame of an audio signal, comprising:

receiving a bit stream representative of the encoded frame from an encoder;

determining if the encoded frame is a voice frame or a noise frame; and responsive to determining that the encoded frame is a noise frame, extracting one or more indices from the bit stream, wherein each index is representative of a previously-processed series of sub-band samples generated for a corresponding frequency sub-band within a plurality of frequency sub-bands and stored in a history buffer located in the encoder;

for each index, reading a previously-processed series of sub-band samples associated with the frequency sub-band with which the index is associated from a history buffer located in a decoder wherein the index identifies the location of the previously processed series of sub-band samples in the history buffer located in the decoder;

generating a series of decoded output audio samples based on the previously-processed series of sub-band samples read from the history buffer located in the decoder.

14. The method of claim 13, wherein extracting one or more indices from the bit stream comprises extracting one or more encoded indices from the bit stream and decoding each of the one or more encoded indices.

15. The method of claim 13, further comprising:

responsive to determining that the encoded frame is a voice frame, extracting an encoded series of sub-band samples corresponding to each of the plurality of frequency sub-bands from the bit stream, decoding each of the encoded series of sub-band samples to generate a corresponding decoded series of sub-band samples, and combining the decoded series of sub-band samples to generate a series of decoded output audio samples.

16. The method of claim 15, further comprising:

responsive to determining that the encoded frame is a voice frame, storing each decoded series of sub-band samples in the history buffer located in the decoder.

17. The method of claim 13, further comprising:

responsive to determining that the encoded frame is a noise frame, extracting an identifier of one of a plurality of frequency sub-bands from the encoded bit stream, extracting an encoded series of sub-band samples from the encoded bit stream, decoding the encoded series of sub-band samples in an un-quantizer associated with the frequency sub-band identified by the identifier to generate a corresponding decoded series of sub-band samples, and combining the decoded series of sub-band samples with the previously-processed series of sub-band samples read from the history buffer located in the decoder to generate the series of decoded output audio samples.

18. The method of claim 17, further comprising:

responsive to determining that the encoded frame is a noise frame, storing the decoded series of sub-band samples in the history buffer located in the decoder.

19. An audio encoder, comprising:

an analysis filter bank configured to receive a series of input audio samples representative of a frame of an audio signal and to generate a series of sub-band samples for each of a plurality of frequency sub-bands based on the input audio samples;

scale factor determination logic configured to determine a scale factor for each frequency sub-band based on the sub-band samples generated for each frequency sub-band;

a voice activity detector configured to determine if the frame is a voice frame or a noise frame based on one or more of the scale factors; and sub-band index determination logic configured to identify and encode an index representative of a previously-processed series of sub-band samples stored in a history buffer located in the audio encoder for at least one of the frequency sub-bands responsive to a determination that the frame is a noise frame; and bit packing logic configured to receive the encoded index and arrange the encoded index within a bit stream for transmission to a decoder.

20. An audio decoder, comprising:

bit unpacking logic configured to receive a bit stream representative of an encoded frame of an audio signal from an audio encoder;

a noise frame detector configured to determine if the encoded frame is a voice frame or a noise frame;

a sub-band index reader configured to extract one or more indices from the bit stream responsive to a determination that the encoded frame is a noise frame, wherein each index is representative of a previously-processed series of sub-band samples generated for a corresponding frequency sub-band within a plurality of frequency sub-bands stored in a history buffer located in the encoder;

a sub-band samples reader configured to read, for each index, a previously-processed series of sub-band samples associated with the frequency sub-band with which the index is associated from a history buffer located in the audio decoder responsive to a determination that the encoded frame is a noise frame, wherein the index identifies the location of the previously processed series of sub-band samples in the history buffer located in the audio decoder; and a synthesis filter bank configured to generate a series of decoded output audio samples based on the previously-processed series of sub-band samples read from the history buffer located in the audio decoder responsive to a determination that the encoded frame is a noise frame.

* * * * *

UNITED STATES PATENT AND TRADEMARK OFFICE

CERTIFICATE OF CORRECTION

PATENT NO. : 8,190,440 B2
APPLICATION NO. : 12/394403
DATED : May 29, 2012
INVENTOR(S) : Laurent Pilati et al.

It is certified that error appears in the above-identified patent and that said Letters Patent is hereby corrected as shown below:

On Title page, in field (73), in "Assignee", in column 1, line 1, delete "Irvince," and insert -- Irvine, --, therefor.

Signed and Sealed this
Fourteenth Day of August, 2012

David J. Kappos
*Director of the United States Patent and Trademark Office*